(12) United States Patent
Granat

(10) Patent No.: US 7,596,006 B1
(45) Date of Patent: Sep. 29, 2009

(54) REDUCING OUTPUT RIPPLE FROM A SWITCHED MODE POWER CONVERTER

(75) Inventor: Stanley M. Granat, Clay, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 369 days.

(21) Appl. No.: 11/501,263

(22) Filed: Aug. 9, 2006

(51) Int. Cl.
*H02M 1/12* (2006.01)
*H02M 3/335* (2006.01)
*G05F 3/16* (2006.01)

(52) U.S. Cl. ............... 363/39; 363/16; 363/41; 323/224

(58) Field of Classification Search ........... 363/16, 363/17, 39, 40, 41, 42, 43; 323/220, 224, 323/225, 228, 232, 259, 261, 262, 266, 282, 323/283, 284, 285, 286, 290, 332, 351, 353
See application file for complete search history.

(56) References Cited

U.S. PATENT DOCUMENTS

| | | | |
|---|---|---|---|
| 4,456,872 A | 6/1984 | Froeschle | |
| 5,659,464 A * | 8/1997 | Esser | 363/41 |
| 6,396,724 B1 * | 5/2002 | Hirst | 363/125 |
| 6,437,999 B1 * | 8/2002 | Wittenbreder | 363/39 |
| 6,979,987 B2 | 12/2005 | Kernahan et al. | |

* cited by examiner

*Primary Examiner*—Akm E Ullah
*Assistant Examiner*—M'Baye Diao
(74) *Attorney, Agent, or Firm*—Howard IP Law Group, PC

(57) ABSTRACT

The present invention pertains to a switching regulator having two inductors that discharge stored energy during the switching operation to an output capacitor, which integrates the pulses and supplies an average voltage plus ripple to a load. The two inductors are each connected to one of a pair of equivalent inductors to form a common mode filter having magnetically interacting windings that introduce negligible inductance in series with a differential mode of current flow, in which the current in the winding of one of the pair of inductors opposes the current in the winding of the other pair of inductors during exposure to a common mode signal resulting in a cancellation of ripple current flow reaching the load.

20 Claims, 5 Drawing Sheets

US 7,596,006 B1

REDUCING OUTPUT RIPPLE FROM A SWITCHED MODE POWER CONVERTER

BACKGROUND OF THE INVENTION

1. Field of the Invention

This application is related to the field of switching power regulators for supplying output current to a pulsed load.

2. Description of the Prior Art

Switched mode power supplies for converting DC voltages in inductive-capacitive discharge pulsed radar applications are known in the prior art. Often they employ a buck-derived topology with feedback loops for voltage regulation and over current protection. Switched mode processes inherently produce ripple voltages due to the spurious frequencies generated when the DC voltages are switched into the reactive components. The ripple voltage limits the use of switched mode power converters in many applications. For example, ripple atop the output pulses supplied by power converters to RF transmitters interfere with signal processing of radar returns by reducing the range and or target detectability of the return signal.

The buck mode converter provides a steady state output current with a superimposed saw tooth shaped ripple pattern. Filter capacitors at the output supply attenuate the ripple current to provide a low peak-to-peak voltage ripple at the load. This low-level ripple may be excessive for noise intolerant loads. For example, radar RF amplifiers are sensitive to low-level ripple, which affect the output amplitude of the RF pulse burst having a direct effect on target discrimination and ranging capability. To reduce the problem, the prior art adds one or more stages of filtering using series connected inductors and shunt connected capacitors.

In LC filter circuits it is well known that inductor impedance increases with increasing frequency while the capacitor impedance decreases with increasing frequency. When the inductors are in series with the current supply and the capacitors return to ground, these components provide a low pass filter operation that lowers the high frequency ripple generated by the switched mode power converter without dissipating additional excessive power. However, each inductor and capacitor employed also contains additional electrical components referred to as parasitics in their realizable implementations. An inductor constructed from wire wrapped around a form creates multiple capacitors in parallel with the inductance. These tend to reduce the impedance of the inductor at higher filtering frequencies. The wire itself contributes additional series resistance. The capacitors contain series resistance to current flow due to both the dielectric material used in their construction and the physical connections from the external leads to the internal plates of the capacitor. At the higher power levels found in radar pulsed loads, it is common practice to use aluminum or tantalum type capacitors for both filtering and energy storage. Both types have a relatively large equivalent series resistance, which reduces the ripple noise attenuation achievable from the filter capacitance and inductance alone.

Adding filters increases the weight and volume of a product. The extra filtering also creates additional delays in the re-supply of power to the output capacitors. This slows the supply's response to transient pulse loads and introduces phase shifts to the feedback path, which are detrimental to voltage and current regulation. Any additional filtering should supply as much attenuation of the unwanted signals as possible without introducing excessive phase shifts that would complicate closed loop controller operations. Additionally, any added filtering should consume as little of the available volume as possible so that it can fit within the design envelope.

SUMMARY OF THE INVENTION

The present invention pertains to a switching regulator having an input voltage for applying an output current to a pulsating load, wherein the regulator includes an input voltage source, inductance, storage capacitance, and a common mode filter for maintaining a filtered output current for a pulse load. The switching regulator uses a bistable pulse width generator connected to two inductors, to discharge energy stored in the inductors during the switching operation into an output capacitor, which integrates the pulses and supplies an average voltage level plus ripple to a load. The two inductors are each connected to one of a pair of equivalent inductors to form a common mode filter having magnetically interacting windings that introduce negligible inductance in series with a differential mode of current flow and function as a transformer, in which the current in the winding of one of the equivalent pair of inductors opposes the current in the winding of the other equivalent pair of inductors during exposure to a common mode signal resulting in a cancellation of ripple current flow reaching the load.

BRIEF DESCRIPTION OF THE DRAWINGS

The invention is best understood from the following detailed description when read in connection with the accompanying drawing. The various features of the drawings are not specified exhaustively. On the contrary, the various features may be arbitrarily expanded or reduced for clarity. Included in the drawing are the following figures.

DETAILED DESCRIPTION OF THE INVENTION

In the figures to be discussed the circuits and associated blocks and arrows represent functions of the apparatus according to the present invention, which may be implemented as electrical circuits and associated wires or data busses, which transport electrical signals. Alternatively, one or more associated arrows may represent communication (e.g., data flow) between software routines, particularly when the present process or apparatus or a portion thereof is embodied in a digital process.

Figure 1A:
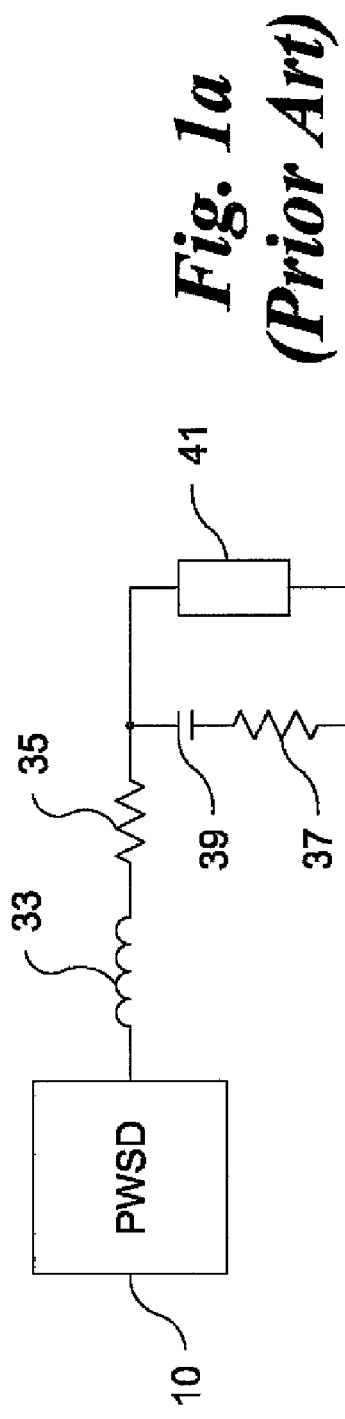
FIG. 1a is a circuit diagram illustrating a switched mode power converter according to the prior art.

FIG. 1a is a prior art example of a buck switching regulator having no stages of ripple filtering. A pulse width modulated switching device ("PWSD") 10 supplies a high-level generally square wave output (e.g., several hundred DC volts) to a series buck mode inductor 33 and a charging capacitor 39 to provide a lower voltage (e.g., 50V into a 20 A current load). Generally, a load 41 is a pulsed load requiring a high current.

Figure 2:
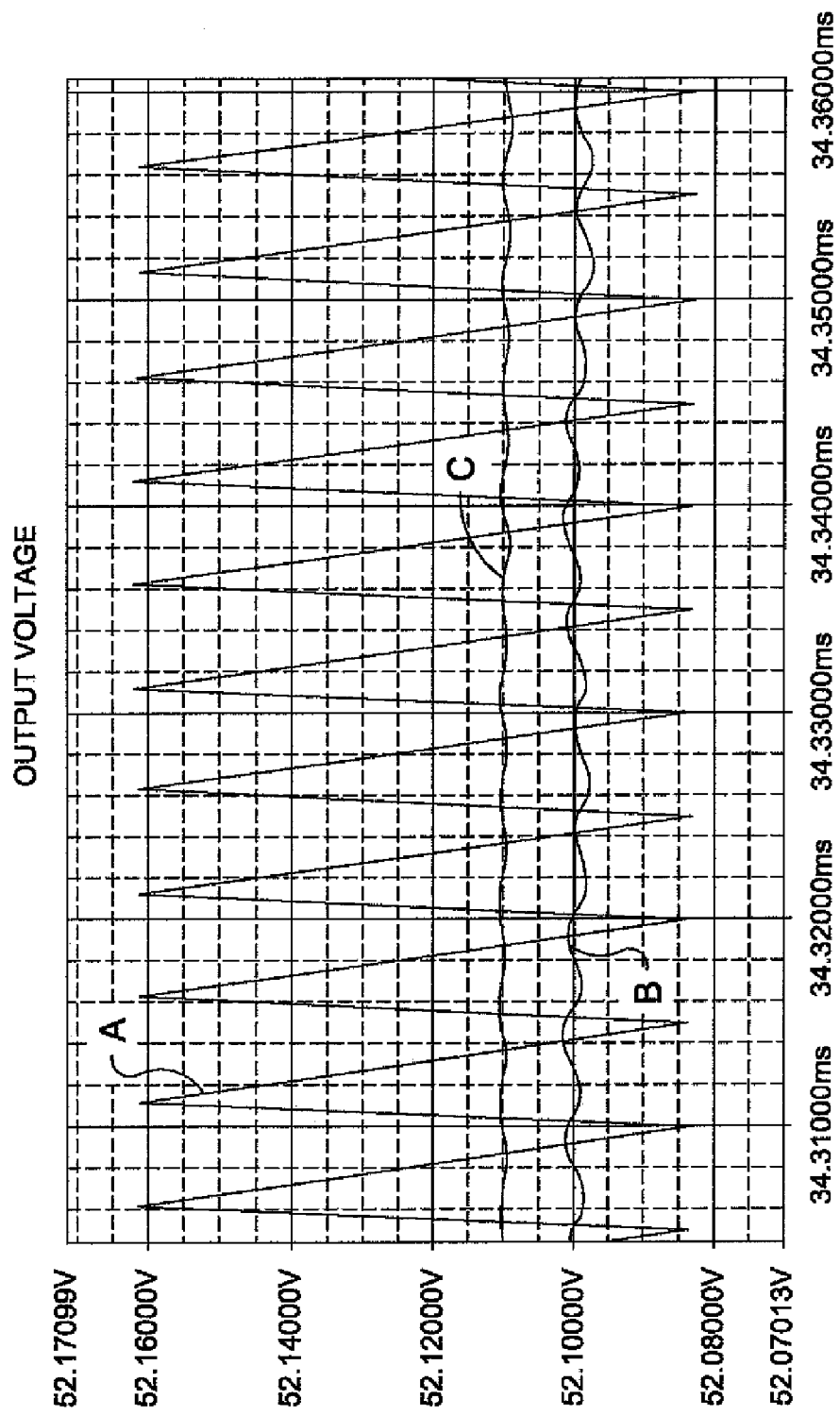
FIG. 2 is a graph showing a switched mode power converter filter output.

The circuit in FIG. 1a employs the inductor 33 and capacitor 39 to generate the desired AC/DC voltage and current required by the load 41. The output voltage is equal to the duty cycle of the PWSD 10 multiplied by the input supply voltage. Any deviation of the output voltage from the theoretical or calculated output voltage will be due to the parasitic effects of inductor 33 parasitic resistance 35. Parasitic resistance 37 causes output response time variations in the output pulse and reduces the ideal current supply capability of capacitor 39. FIG. 2 reference A is a graph showing a switched mode power converter of FIG. 1a output showing a 75 millivolt peak-to-peak saw tooth ripple voltage waveform biased at approximately 52.085 volts DC.

Figure 1B:
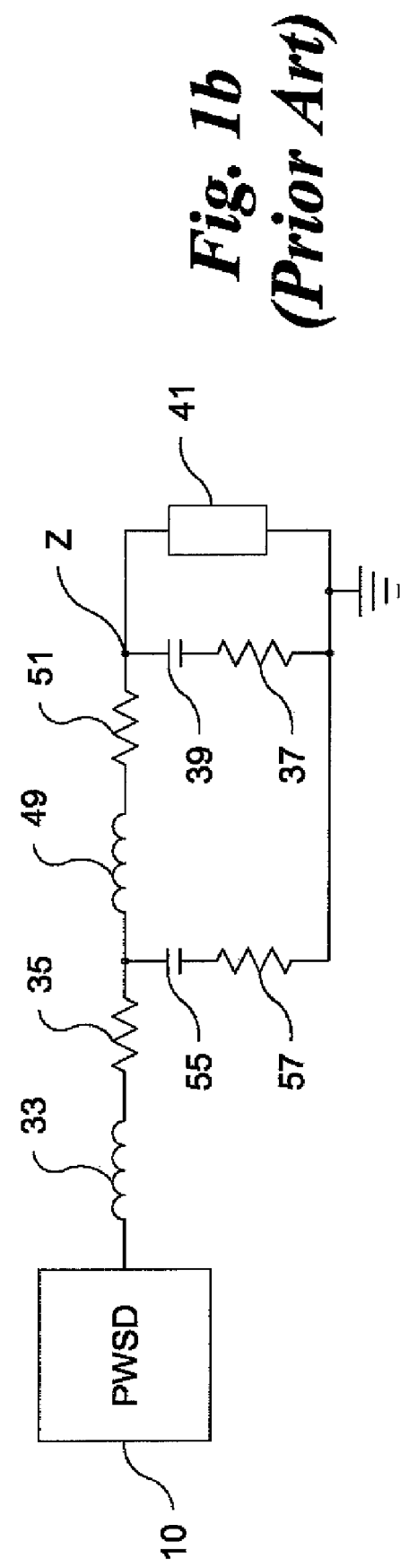
FIG. 1b is a circuit diagram illustrating a switched mode power converter and filter according to the prior art.

FIG. 1b is a prior art example of a buck switching regulator having one stage of inline ripple filtering. The PWSD 10 supplies a high-level generally square wave output (e.g., typically 270Vdc) to a series inductor 33 and a charging capacitor 39 to provide a lower voltage into a high current load 41 (e.g., typically 20 A). The circuit in FIG. 1b employs the inductor 33 and capacitor 39 to generate the desired AC/DC voltage current required by the load 41. Parasitic resistors 35, 57, 51 and 37 refer to the same parasitic affects described above with respect to the inductors and capacitors. Parasitic resistors 57 and capacitor 55 between the junctions of resistor 35 and inductor 49 filter unwanted frequencies generated by the transient switching of power to the inductors and capacitors and their parasitic components. FIG. 2 reference B is a graph showing the switched mode power converter of FIG. 1b output having a lower (4 millivolt) peak-to peak ripple amplitude than the circuit in FIG. 1a.

At higher power and frequency levels, the inductors utilized in switch mode power converters have windings usually constructed from multiple, parallel windings that permit higher current operation than that available in a single conductor. These multiple parallel windings share the same core and have the same number of turns. Each individual winding is a separate inductor, carrying approximately equal currents and having the same voltages applied to them. Each produces the same wave shapes at their individual outputs of the inductors. If the output capacitor, such as capacitor 39 termination end of one such an inductor were disconnected from the inductor, such as inductor 33, it is possible to make use of the signals created by these individual inductors to create a common mode ripple signal. A common mode filter then becomes usable to attenuate these ripple signals.

Figure 3:
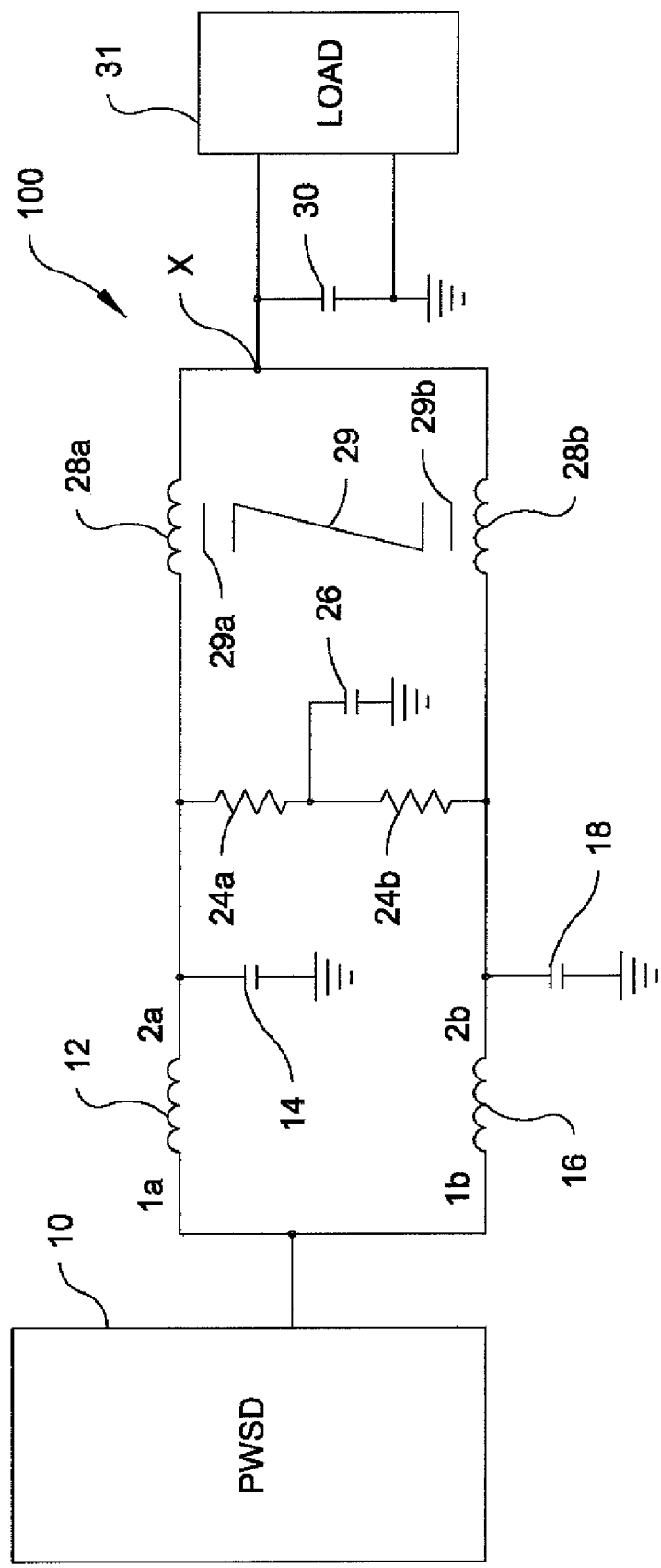
FIG. 3 is a block diagram illustrating a switched mode power converter filter according to an embodiment of the invention.

FIG. 3 illustrates one embodiment of the present invention wherein a switched mode power converter 100 supplies an output current and voltage to a pulsating load 31 having pairs of buck mode inductors 12, 16 to discharge energy stored in the inductors 12, 16 during the switching operation to an output capacitor 30. In one exemplary embodiment, the buck mode inductors 12, 16 for generating the common mode signal are formed by having their separate windings wound around a common core. In another exemplary embodiment, inductors 12, 16 are separate inductors (i.e. no common core) but which have relatively matching electrical characteristics sufficient to enable the generation of the common mode signal from the two inductors. The matched or substantially equivalent electrical characteristics include for example, matched or equivalent inductance, resistance and magnetic core materials, for generating the common mode signal. Each inductor 12, 16 of the pair of inductors is connected to a corresponding one of a pair of equivalent inductors 28a, 28b, having magnetically interacting windings 29 in which the current in the winding of one of the pair of equivalent inductors 28a, 28b opposes the current in the winding of the other of the pair of the equivalent inductors 28b, 28a during exposure to a common mode signal, resulting in a cancellation of ripple current flow reaching the load 31. To create magnetically interacting windings 29 each of the pairs of equivalent inductors 28a, 28b may be wound around a common core.

It will be recognized by those skilled in the art that two or more pairs of inductors 12, 16, may be employed in a parallel circuit topology to supply additional current to the load 31 or to improve filtering of the ripple. A plurality of buck inductors, such as 12, 16 where each inductor of the plurality of buck inductors 12, 16 is connected to one of a plurality of equivalent inductors 28b, 28a having magnetically interacting windings in which the current in the winding of one of the plurality of equivalent inductors 28b, 28a opposes the current in the winding of the other one resulting in a cancellation of ripple current that otherwise flows to the load 31.

FIG. 3 buck switched regulator 100 utilizes a bistable PWSD 10 as described above in connection with FIG. 1a and FIG. 1b. The PWSD 10 connects to end 1a of the inductor 12 and to end 1b of a second inductor 16. The ends 2a, 2b of the inductors, 12, 16 discharge the energy stored in the inductors 12, 16 during the switching operation into output capacitor 30, which integrates the pulses and supplies an average voltage level plus ripple to load 31. The equivalent inductors 28a, 28b form a common mode filter having magnetically interacting windings 29 that introduce negligible inductance in series with a differential mode of current flow. The impedance of the configuration as shown in FIG. 3 is much larger for common mode signals. Additionally, in the embodiment depicted herein, the two windings on the respective inductors 28a, 28b function as a one to one transformer, in which the current in winding 29a of inductor 28a, opposes the current in winding 29b of inductor 28b during exposure to a common mode signal. Since the currents in this configuration are equal in magnitude, a near complete cancellation of ripple current flow is measured at node X reaching the load 31. This technique exploits that effect by modifying the prior art single buck mode output inductor such that two relatively equivalent inductors 12, 16 supply nearly equivalent parallel currents to each side of a common mode filter embodied in inductors 28a, 28b. It creates a common mode signal from the output ripple currents so that the common mode filter strengths can be utilized for ripple filtering. A direct result is that the common mode filter displays relatively higher levels of attenuation to the ripple currents generated by the PWSD 10 than would be possible with a multiple inline or cascade filter inserted between node Z and load 41 in the prior art circuit shown in FIG. 1b.

Resistor 24a, resistor 24b and capacitor 26 form a snubber circuit to dampen the resonant frequency or minimize LC resonant ringing created by circuit inductance and capacitance, introduced by the inductors and capacitors and various parasitic LC or passive components. Low parasitic resistance filter capacitors 14, 18 are connected between the junctions of the inductors 12, 28a and 16, 28b respectively to shunt the high frequency ripple current so as it does not reach the supply to the pulsed load 31.

Figure 4:
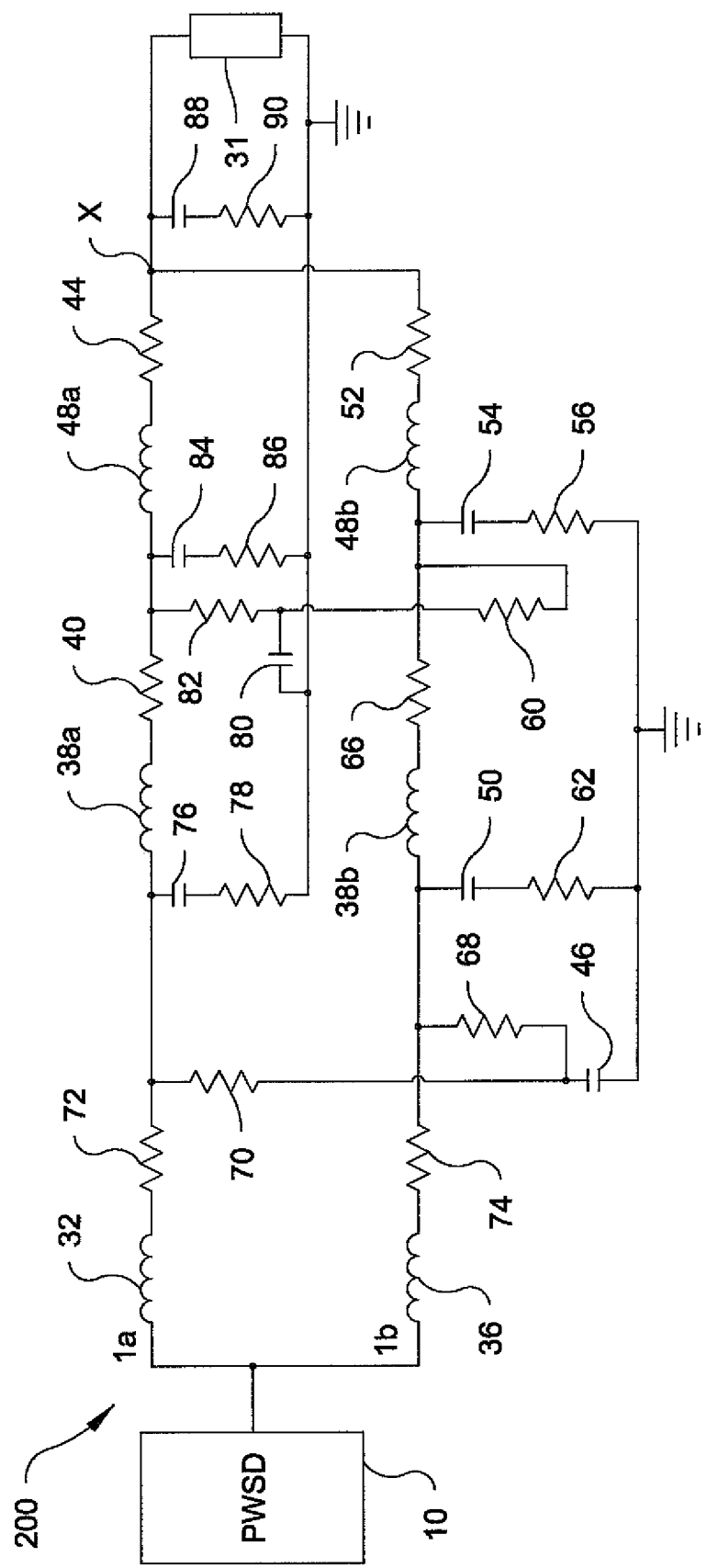
FIG. 4 is a circuit diagram illustrating a switched mode power converter filter according to another embodiment of the invention.

Turning to FIG. 4, a switching regulator 200 of the present invention for maintaining a filtered output current for a pulse load 31 is configured as a common mode filter to attenuate ripple signals. The switching regulator 200 utilizes the bistable PWSD 10 as described above in connection with FIG. 3. The PWSD 10 connects to end 1a of an energy storage buck inductor 32 and to end 1b a second energy storage buck inductor 36. The inductors, 32, 36 discharge during the switching operation into an output capacitor 88. The inductors 38a, 38b form a first section of a common mode filter having magnetically interacting windings as described in connection with FIG. 3 that introduce negligible inductance in series with a differential mode of current flow and function as a one to one transformer, in which the currents in each of its separate windings are opposed during exposure to a common mode signal.

The equivalent inductors 48a, 48b form a second or cascaded section of a common mode filter having magnetically interacting windings as described in connection with FIG. 3 that also introduce negligible inductance in series with a differential mode of current flow and function so as the current in each of its separate windings is opposed during exposure to a common mode signal. It will be recognized by those skilled in the art that the converter may include any number of cascading filters wherein each one of a pair of equivalent inductors 38a, 38b or 48a, 48b are connected in series with a second pair of equivalent inductors. Furthermore the converter application will determine the number of cascade of filters and establish whether each cascaded pair of equivalent inductors have identical or different inductance values.

The currents in each of the sides of the filters 38a, 48a and 38b, 48b are equal in magnitude and essentially cancel the ripple current flowing into node X. Resistor 70, resistor 68 and capacitor 46 form a first snubber circuit to dampen the resonance frequency created by circuit inductance and capacitance. Resistor 82, resistor 60 and capacitor 80 form a second snubber circuit to dampen the resonance frequency created by circuit inductance and capacitance. Low parasitic resistance filter capacitors 76, 50, 84 and 54 filter the high frequency current from the supply. Resistors 72, 74, 40, 66, 78, 62, 86, 56, 44, 52 and 90 represent parasitic resistances associated with the respective inductors and capacitors to which they attached in FIG. 4.

This filtering technique of the present invention alters the phase shift of the output differential signals affecting the closed loop control system (not shown). But, compared to the prior art filter in FIG. 1b, the influence on the control loop is minimal. Each common mode filter stage provides higher attenuation and therefore fewer stages are required so that a smaller accumulated phase shift occurs.

The switching mode converter 200 was simulated to compare the attenuation, gain and phase to the prior art. The structure was simplified by replacing the switches and gate drivers with a pulse generator as characterized by PWSD 10. The component values were adjusted to provide approximately the same slew rates and settling behaviors as the circuits described in FIG. 1a, and FIG. 1b. The simulation of the circuit illustrated in FIG. 4 used inductances 38a, 38b having values of 1.92 micro Henries ("uH"); capacitor 50, 76 having values 0.339 micro Farad ("uFd"); cascaded with inductance 48a, 48b having values of 18.07 uH; and capacitors 54, 84 having values 0.389 uFd and an output capacitance 88 having a value of 4200 uFd with an associated parasitic resistance 90 of 0.047 ohms. The parabolic waveform C in FIG. 2 represents the output ripple voltage of the filter described in connection with FIG. 4 and the foregoing component values. The peak-to-peak ripple voltage across capacitor 50 or capacitor 76 requiring filtering is shown as approximately 1.642 volts. At node X the peak-to-peak ripple voltage is approximately 0.9 millivolts indicating a 65.22 dB attenuation when compared to the prior art FIG. 1b.

The gain and the phase shift of the embodiment of the invention as illustrated in FIG. 4 was compared against gain and phase shift of the embodiment shown in the prior art FIG. 1a and FIG. 1b. Referring now FIG. 1a, FIG. 1b and FIG. 4, the values for the inductors 33 in the prior art and inductors 32, 36 of the present invention were fixed at approximately 100 uH. The output capacitor 39 in the prior art and capacitor 88 of the present invention were fixed at approximately 4200 uFd. It was determined that the buck mode inductors 33, and 32, 36 and associated output capacitors 39 and 88 resonate at approximately 220 Hz with a gain peak of +22 dB.

The phase of the FIG. 1a circuit shifts to approximately −140 degrees as the frequency advances through this resonance band. The phase margin for this circuit is approximately 50 degrees at 500 Hz. The circuit containing the conventional filter illustrated in FIG. 1b also shows the addition of a resonant peak at approximately 39 kHz. If not suitably dampened, this gain peak reduces the attenuation to −40 dB, which allows increased ripple output. The phase reaches 270 degrees at the 39 k Hz point. The gain margin is 40 dB at 39 kHz, with a phase margin of 50 degrees at approximately 500 Hz.

Figure 5:
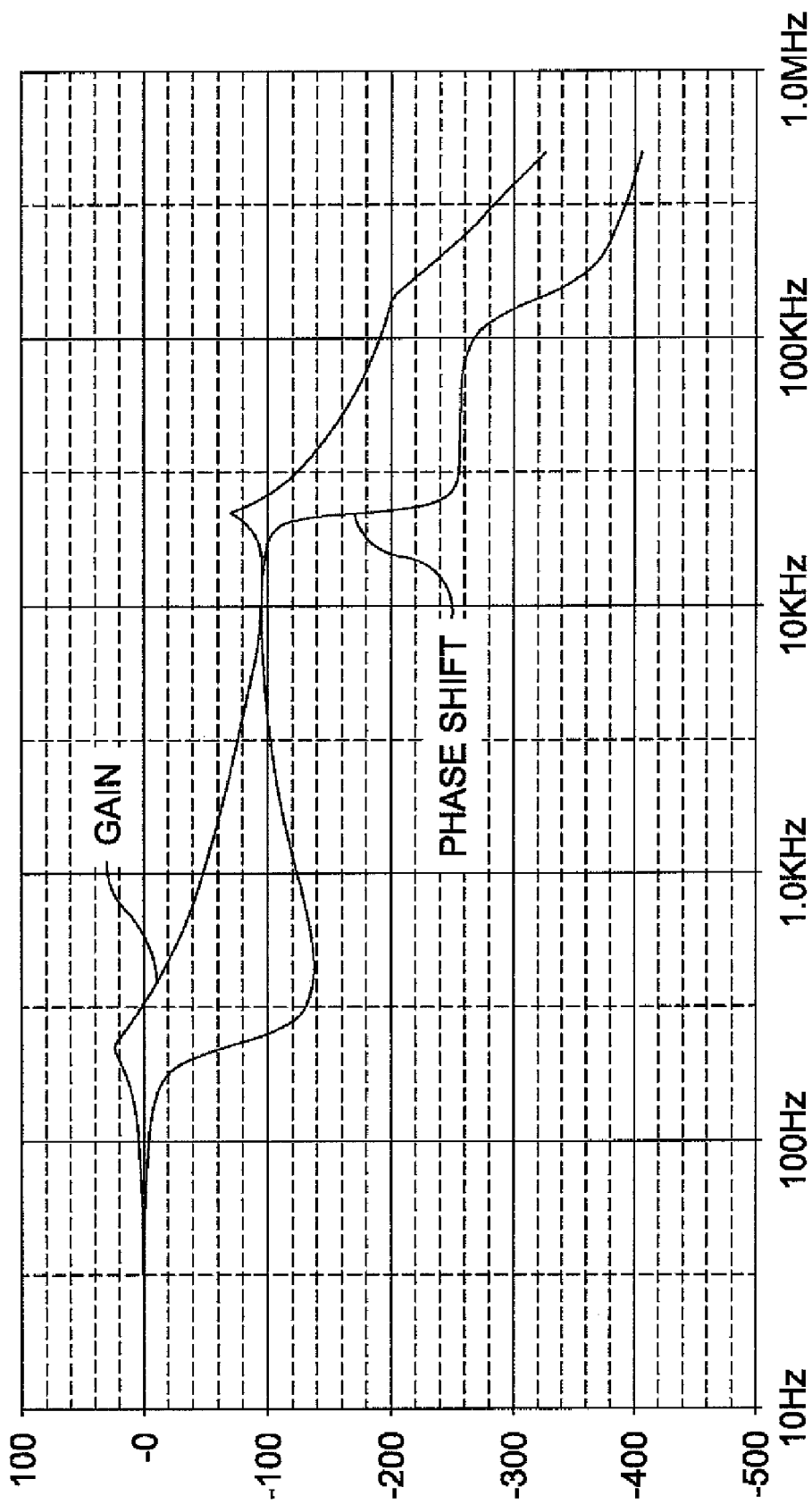
FIG. 5 is a graph illustrating a transfer gain and phase according to an embodiment of the invention.

The transfer gain and phase for the embodiment of the present invention FIG. 4, as graphed in FIG. 5, demonstrates operation at the same resonant frequencies as the prior art in FIG. 1b. The 220 Hz peak is +22 dB producing a phase shift of −140 degrees. A second peak occurs at 39 kHz with a phase shift totaling −260 degrees. Note that the gain peak is lower, providing approximately −70 dB of attenuation. It was found that the phase shift for the invention embodied in FIG. 4, with the component values previously selected is ten degrees less than the conventional filter in FIG. 1b. The gain margin is 70 dB at 39 kHz, with a phase margin of 50 degrees at approximately 500 Hz. The stage of common mode filtering that includes inductor 48a and 48b introduces a third resonance at 200 kHz, with slight peaking. Additional phase shift occurs above this point.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A switched mode power converter for supplying an output current and voltage to a pulsating load comprising:
   a pair of substantially identical buck inductors, each receiving a switching current signal and providing a common mode ripple signal; each inductor of the pair of buck inductors electrically connected to the load through a corresponding one of a pair of equivalent inductors responsive to said common mode ripple signal and having a common output terminal, said equivalent inductors having magnetically interacting windings in which the current in the winding of one of the pair of equivalent inductors opposes the current in the winding of the other of the pair of equivalent inductors resulting in a cancellation of ripple current that otherwise flows to the load.

2. The converter of claim 1, further comprising a pair of shunt capacitors, each capacitor electrically coupled to an output of a corresponding one of said buck inductors.

3. The converter of claim 2, further comprising a snubber to minimize resonant frequency ringing caused by the combination of inductance and capacitance.

4. The converter of claim 1, further comprising a cascade of filters wherein each one of a pair of equivalent inductors is connected in series with a second pair of equivalent inductors.

5. The converter of claim 4, wherein the number of cascade of filters is limited by the converter application.

6. The converter of claim 4, wherein each pair of equivalent inductors has unique inductance values.

7. The converter of claim 1, wherein the windings of each of the pairs of buck inductors and each of the pairs of equivalent inductors are wound around a common core.

8. The converter of claim 1, wherein the windings of each of the pair of buck inductors are wound around a common core.

9. The converter of claim 1, wherein the windings of each of the pairs of equivalent inductors are wound around a common core.

10. The converter of claim 1, wherein each of the pair of buck inductors is wound around a separate core and has electrical characteristics sufficiently matched to the other one of said pair to enable generation of the common mode signal.

11. A switched mode power converter for supplying an output current and voltage to a pulsating load comprising: a plurality of substantially identical buck inductors, each receiving a switching current signal and providing a common mode ripple signal; each inductor of the plurality of buck inductors electrically connected to the load through one of a plurality of equivalent inductors responsive to said common mode ripple signal and having a common output terminal, said equivalent inductors having magnetically interacting windings in which the current in the winding of the one of the plurality of equivalent inductors opposes the current in the winding of the other one of the plurality of the equivalent inductors resulting in a cancellation of ripple current that otherwise flows to the load.

12. A switched mode power converter for supplying an output to a load comprising: a pair of substantially identical buck inductors, each having a first port for receiving a common switching current signal and providing equal magnitude ripple currents in phase with one another; a shunt circuit arrangement downstream of said pair of buck inductors for shunting high frequency ripple current output from said pair of buck inductors to generate equal amplitude and in phase ripple voltages; a common mode filter arrangement responsive to said equal amplitude and in phase ripples voltages downstream of said shunt circuit and including a pair of equivalent inductors, each said inductor coupled to an associated one of said pair of buck inductors and having magnetically interacting windings in which current in the winding of one of the pair of equivalent inductors opposes current in the winding of the other one of the pair of the equivalent inductors, the common mode filter arrangement terminating at a common terminal to cause cancellation of ripple current that otherwise flows to the load.

13. The converter of claim 12, wherein a capacitor is coupled to the common terminal of said common mode filter arrangement.

14. The converter of claim 13, wherein the capacitor is coupled in parallel with the load.

15. The converter of claim 12, wherein the shunt circuit arrangement comprises at least a first capacitor coupled to one of the pair of buck inductors; and at least a second capacitor coupled to the other one of the pair of buck inductors, for filtering high frequency current signals.

16. The converter of claim 12, further comprising a snubber circuit arrangement.

17. The converter of claim 16, wherein the snubber circuit arrangement further comprises a capacitor having a first terminal coupled to a pair of floating resistors, and a second terminal coupled to a reference potential.

18. The converter of claim 12, wherein the common mode filter arrangement further includes a cascade of filters, wherein each one of a pair of equivalent inductors is connected in series with a second pair of equivalent inductors.

19. The converter of claim 16, wherein said snubber circuit arrangement is downstream of said shunt circuit arrangement and comprises an RC filter circuit.

20. The converter of claim 12, wherein the windings of each of the pair of buck inductors and each of the pair of equivalent inductors are wound around a common core.

* * * * *

UNITED STATES PATENT AND TRADEMARK OFFICE
CERTIFICATE OF CORRECTION

PATENT NO. : 7,596,006 B1  
APPLICATION NO. : 11/501263  
DATED : September 29, 2009  
INVENTOR(S) : Stanley M. Granat Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 420 days.

Signed and Sealed this

Twenty-eighth Day of September, 2010

David J. Kappos  
*Director of the United States Patent and Trademark Office*